Figure 1:
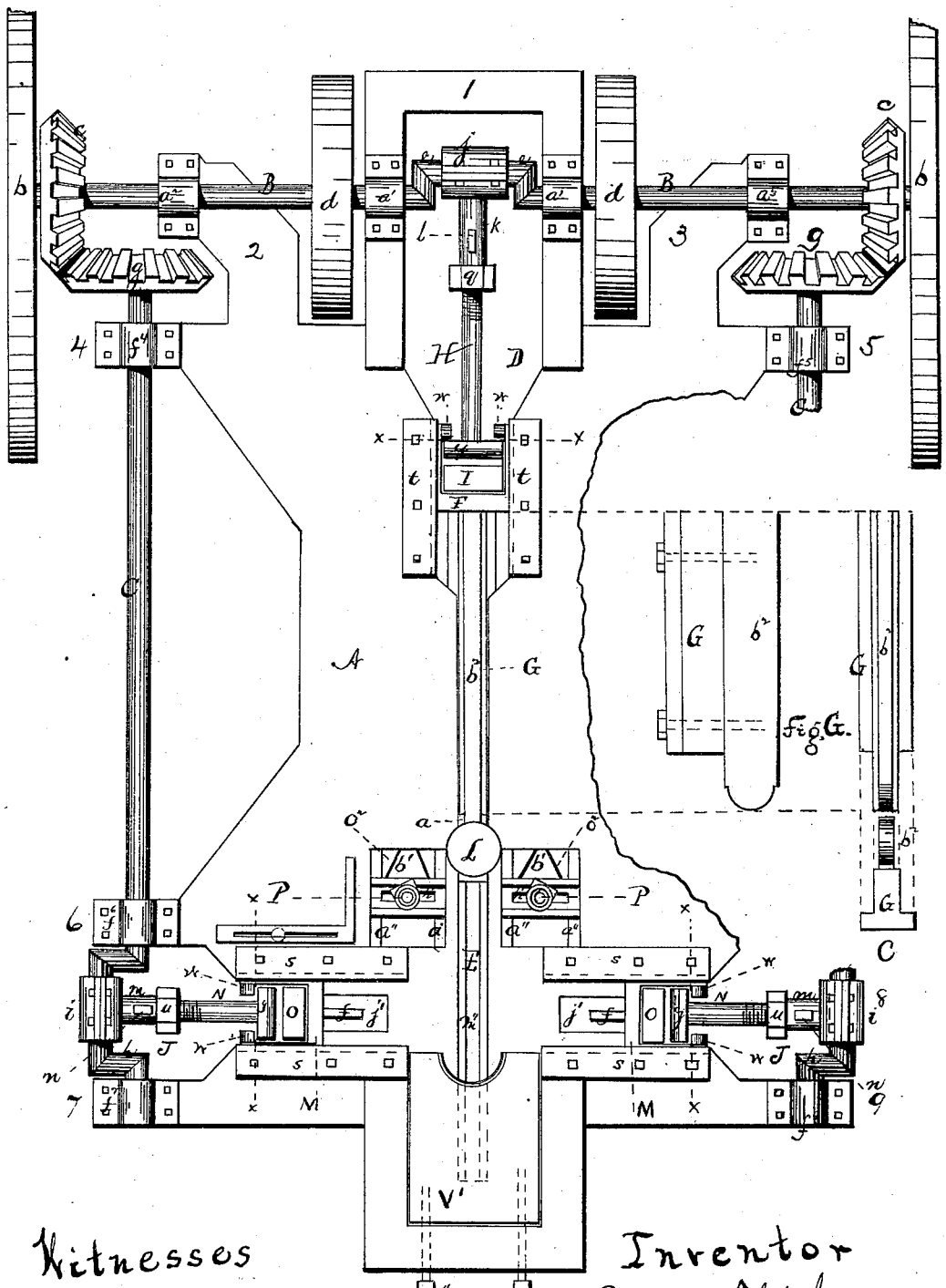

(No Model.) 10 Sheets—Sheet 1.

E. FLETCHER.
MACHINE FOR MAKING STRAPS FOR TACKLE BLOCKS.

No. 264,268. Patented Sept. 12, 1882.

Witnesses
Fred A Tompson.
John F Barrett

Inventor
Edward Fletcher
By his Atty
Herbert G Briggs (No Model.) 10 Sheets—Sheet 2.
E. FLETCHER.
MACHINE FOR MAKING STRAPS FOR TACKLE BLOCKS.
No. 264,268. Patented Sept. 12, 1882.
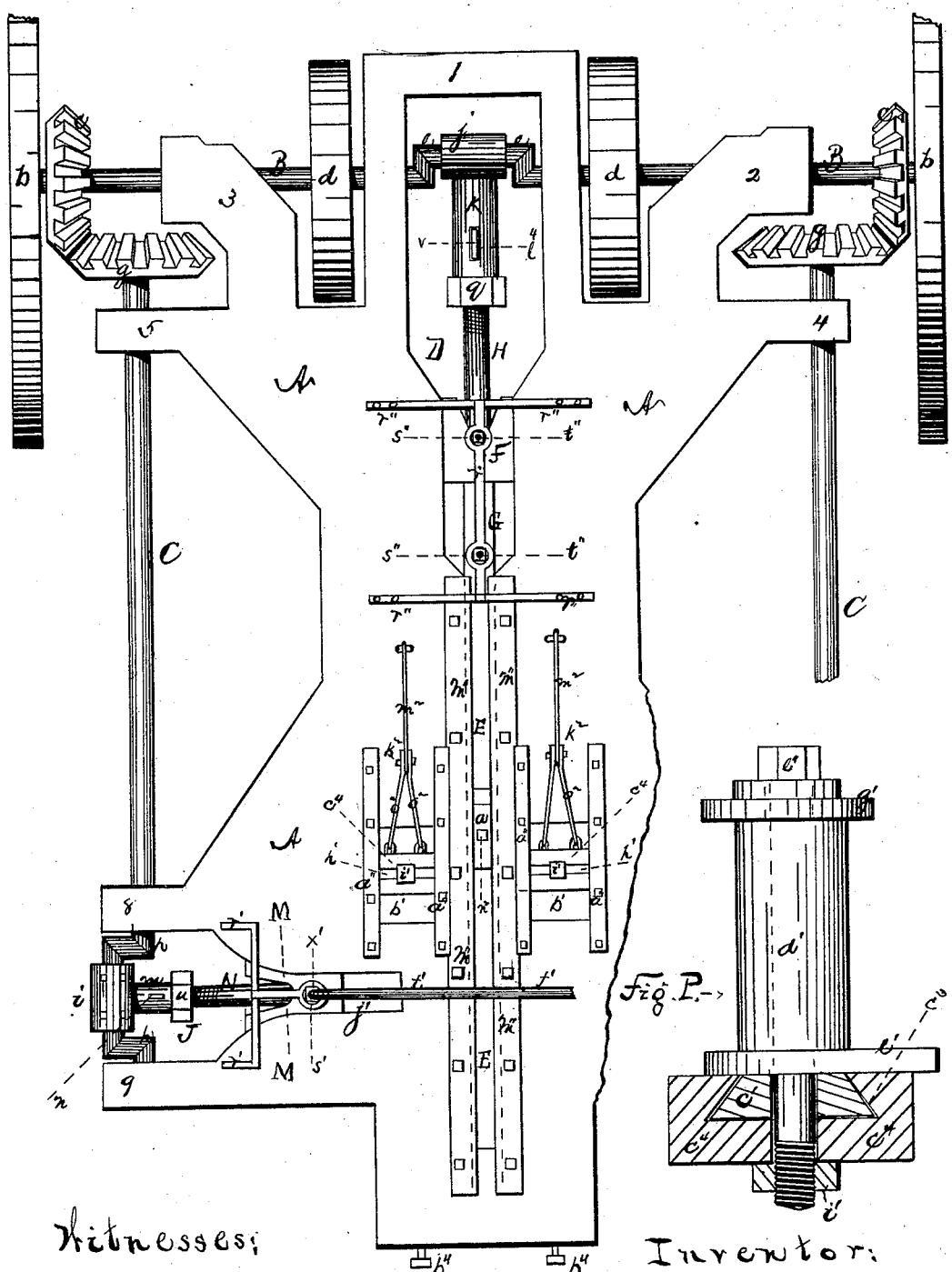
Witnesses:
Fred H. Tompson
John F. Barrett
Inventor:
Edward Fletcher
by his Atty
Herbert G. Briggs (No Model.) 10 Sheets—Sheet 3.
E. FLETCHER.
MACHINE FOR MAKING STRAPS FOR TACKLE BLOCKS.
No. 264,268. Patented Sept. 12, 1882.
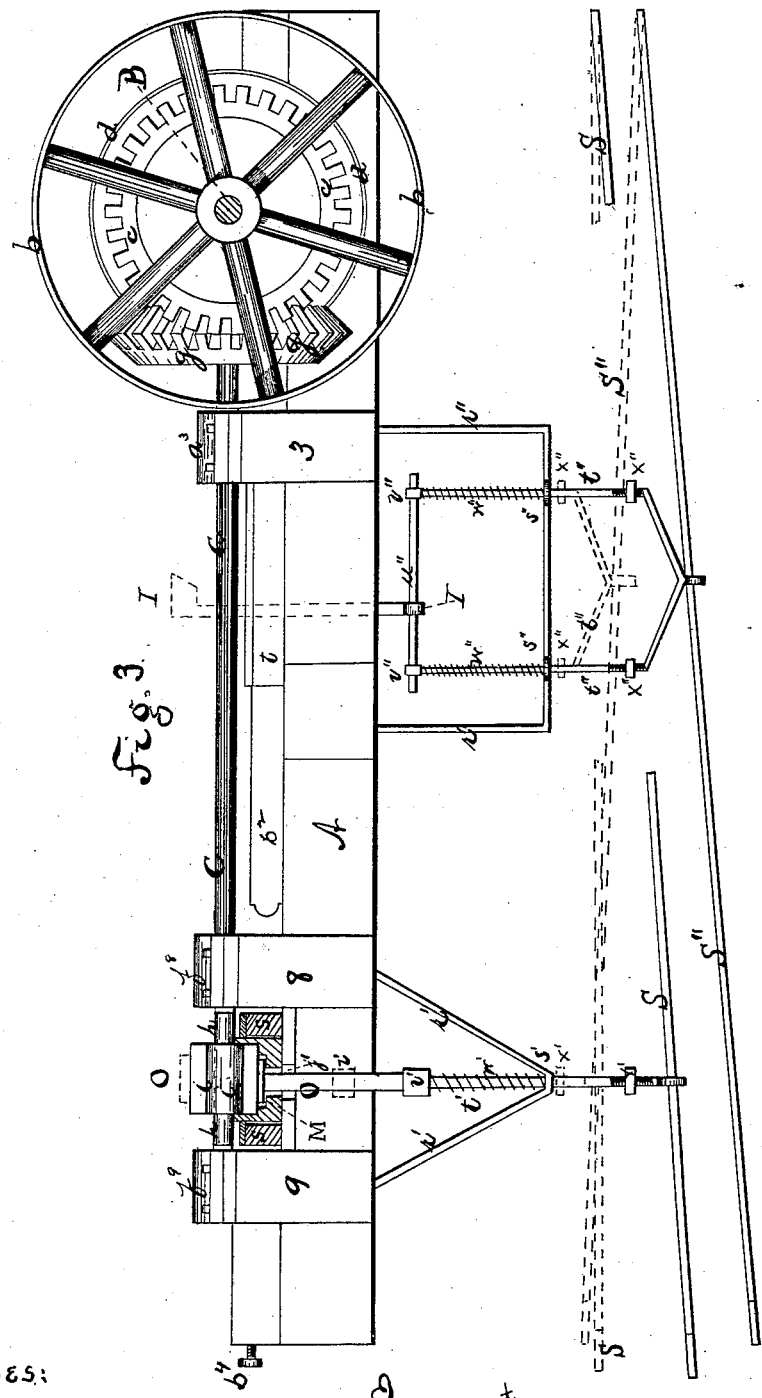

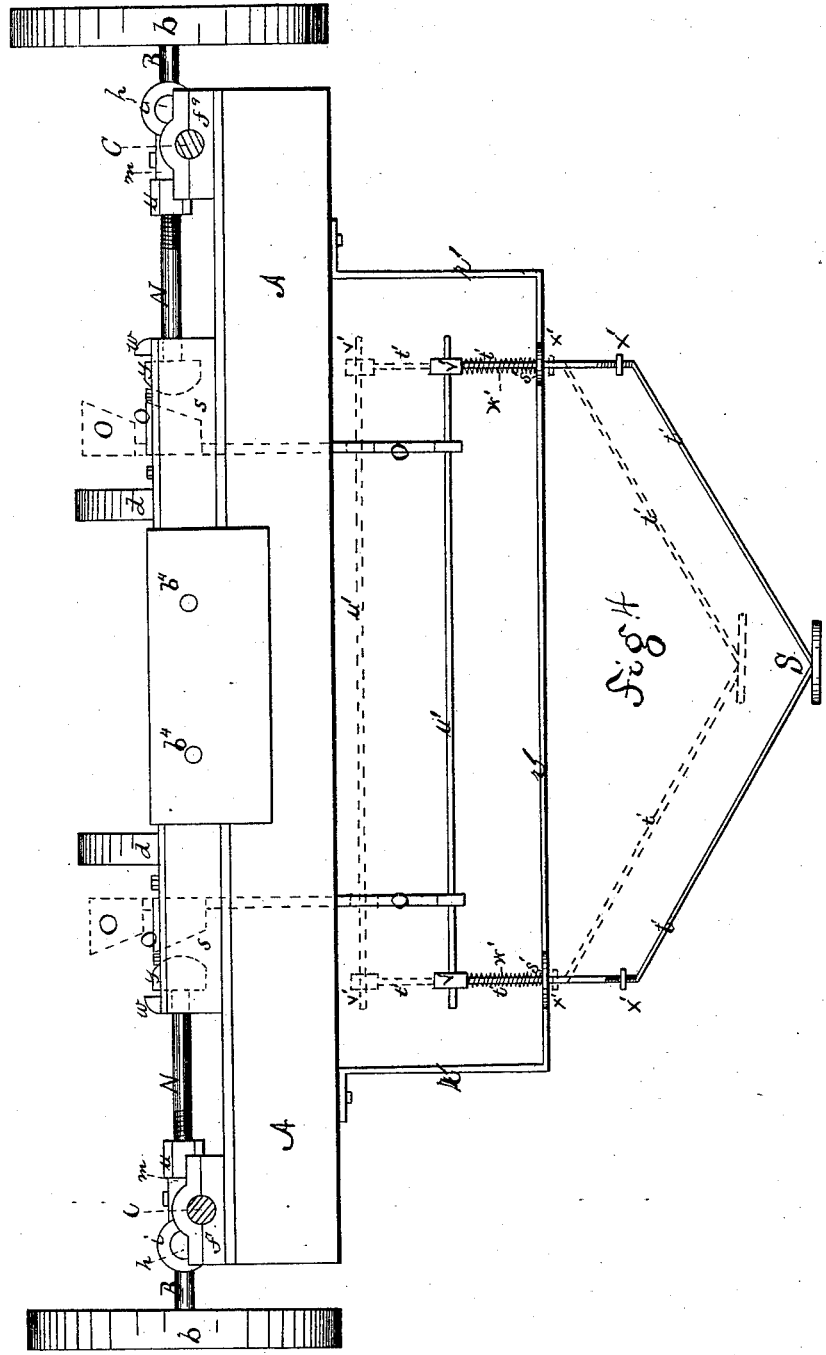

(No Model.) 10 Sheets—Sheet 5.
E. FLETCHER.
MACHINE FOR MAKING STRAPS FOR TACKLE BLOCKS.
No. 264,268. Patented Sept. 12, 1882.
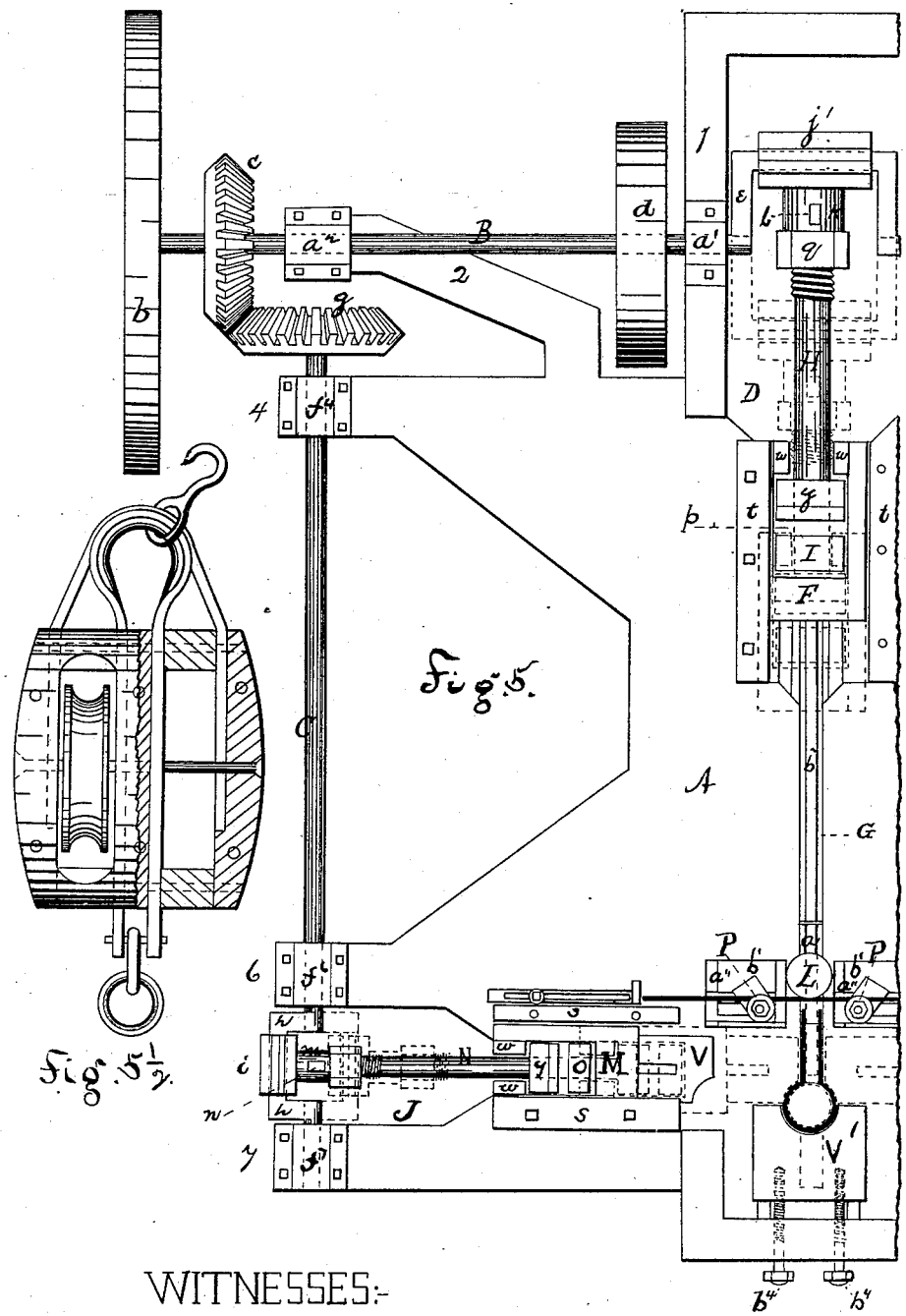

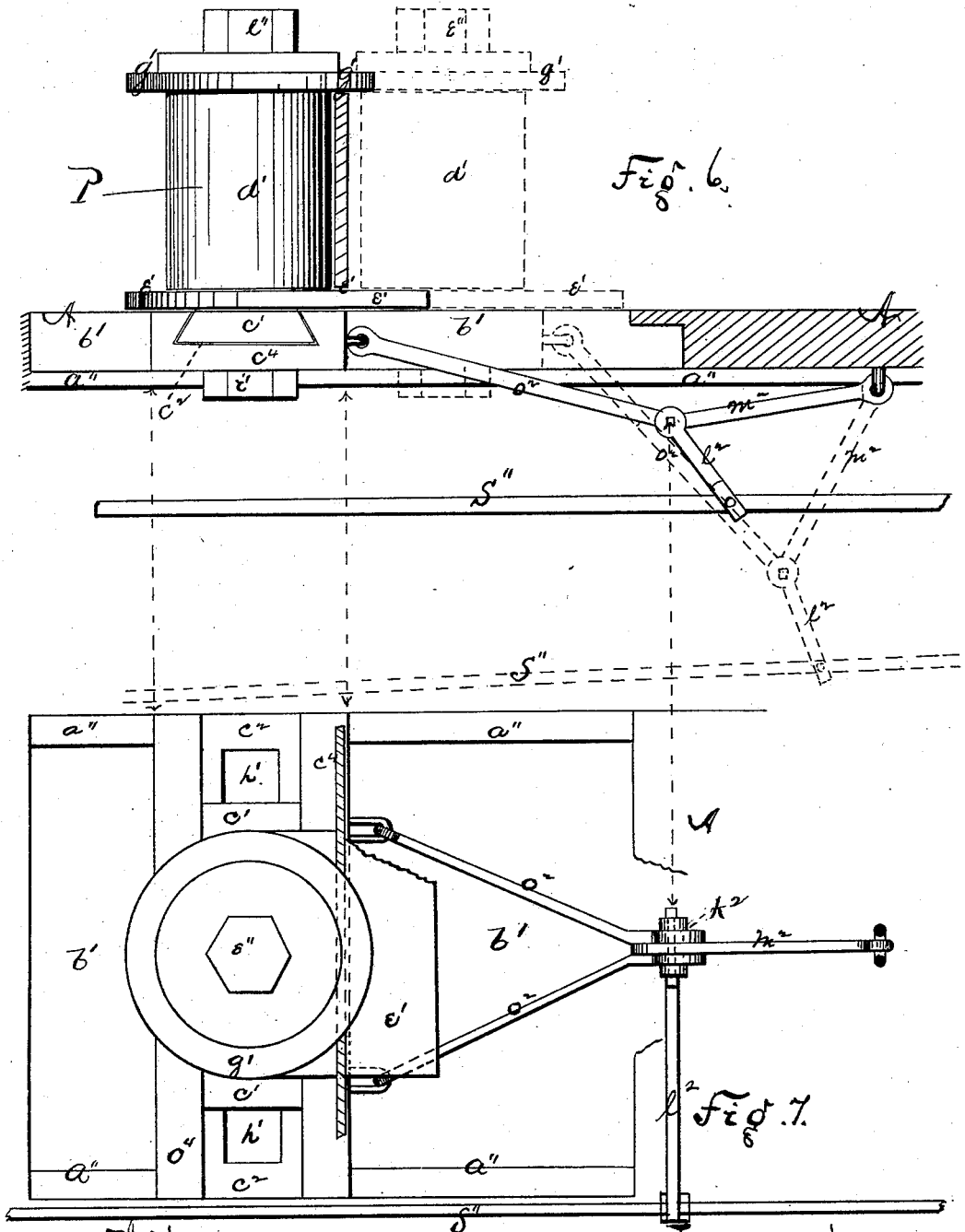

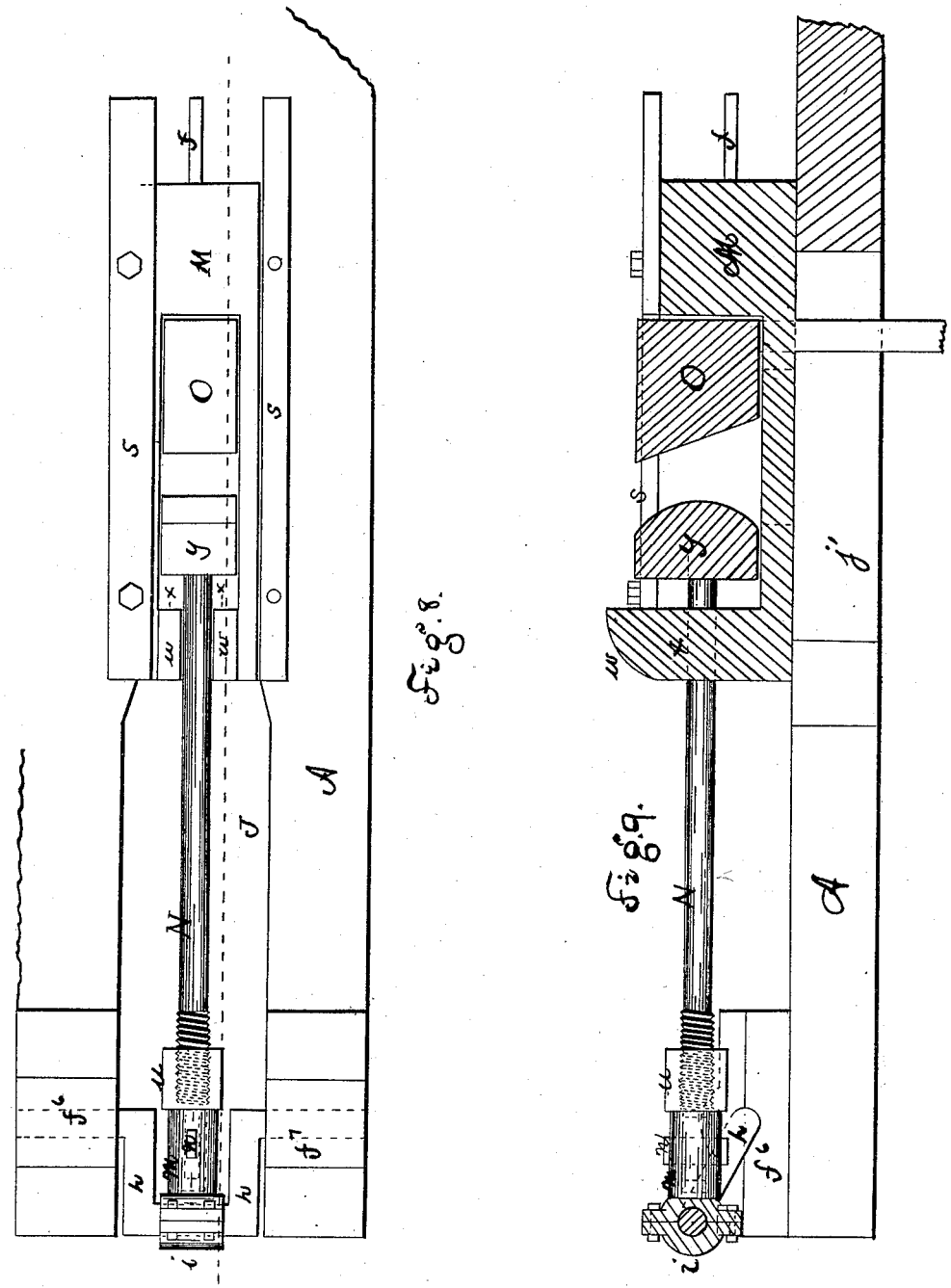

(No Model.)
10 Sheets—Sheet 8.
E. FLETCHER.
MACHINE FOR MAKING STRAPS FOR TACKLE BLOCKS.
No. 264,268. Patented Sept. 12, 1882.
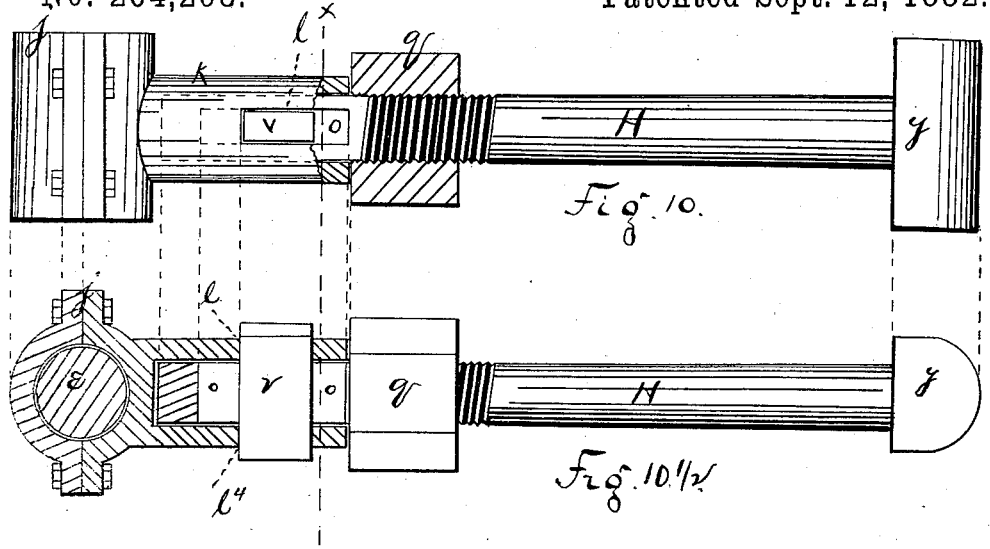
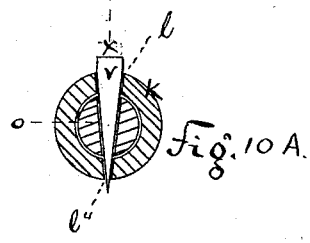
Fig. 10 A.
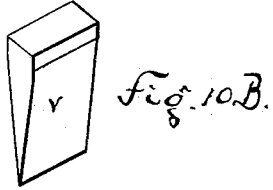
Fig. 10 B.
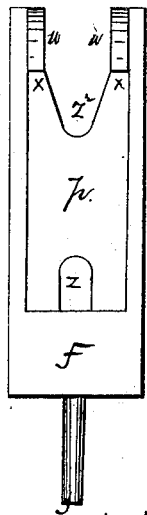
Fig. 11.
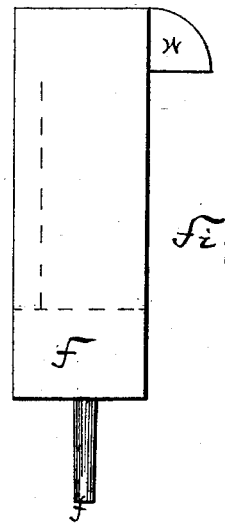
Fig. 12.
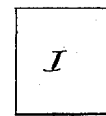
Fig. 13.
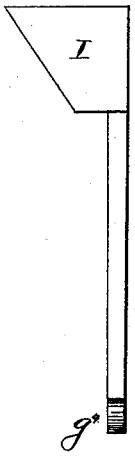
Witnesses:
Fred A. Tompson.
John F. Barrett.
Inventor:
Edward Fletcher
By his Atty
Herbert G. Briggs

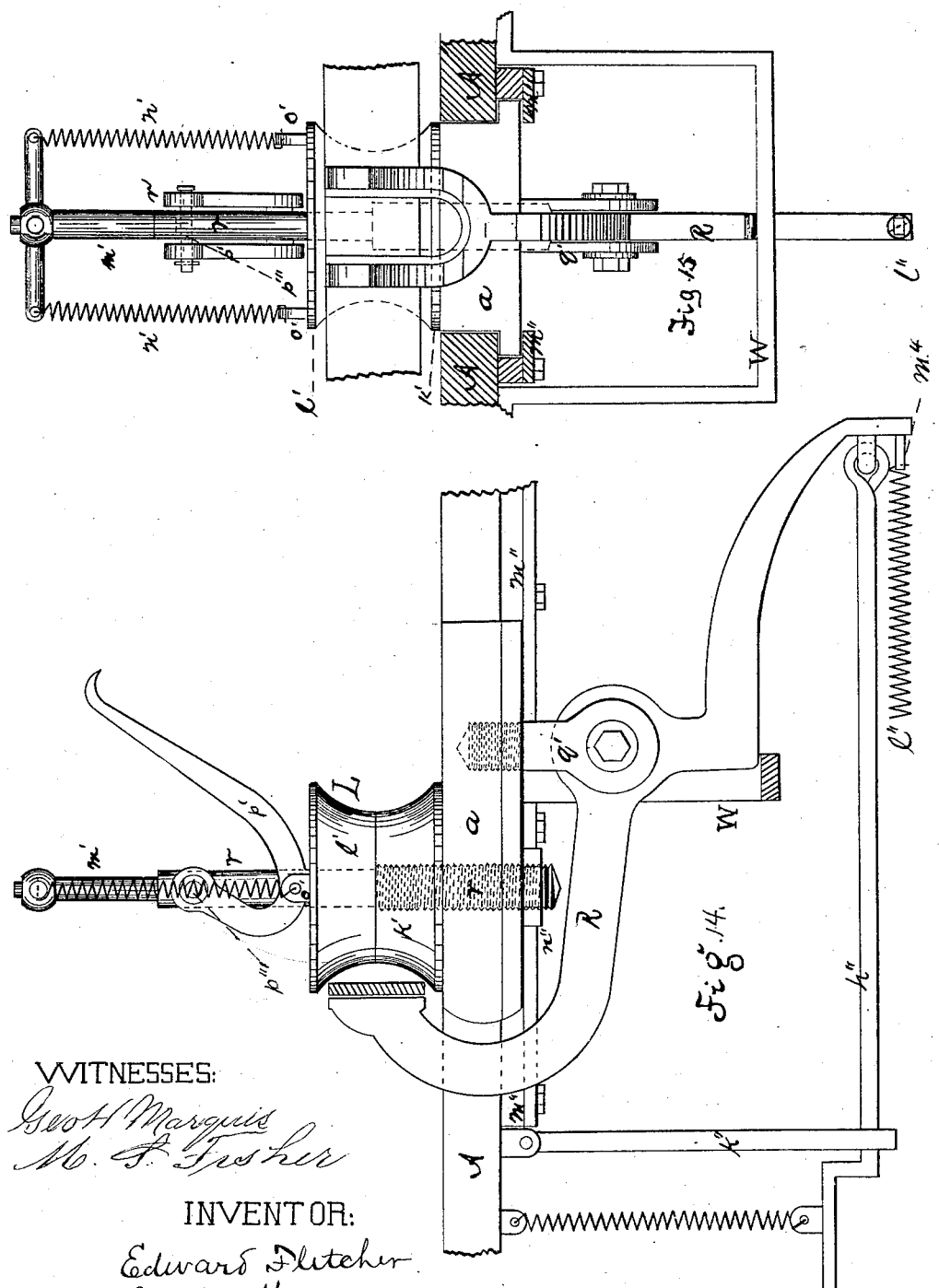

(No Model.)   10 Sheets—Sheet 10.
E. FLETCHER.
MACHINE FOR MAKING STRAPS FOR TACKLE BLOCKS.
No. 264,268.   Patented Sept. 12, 1882.
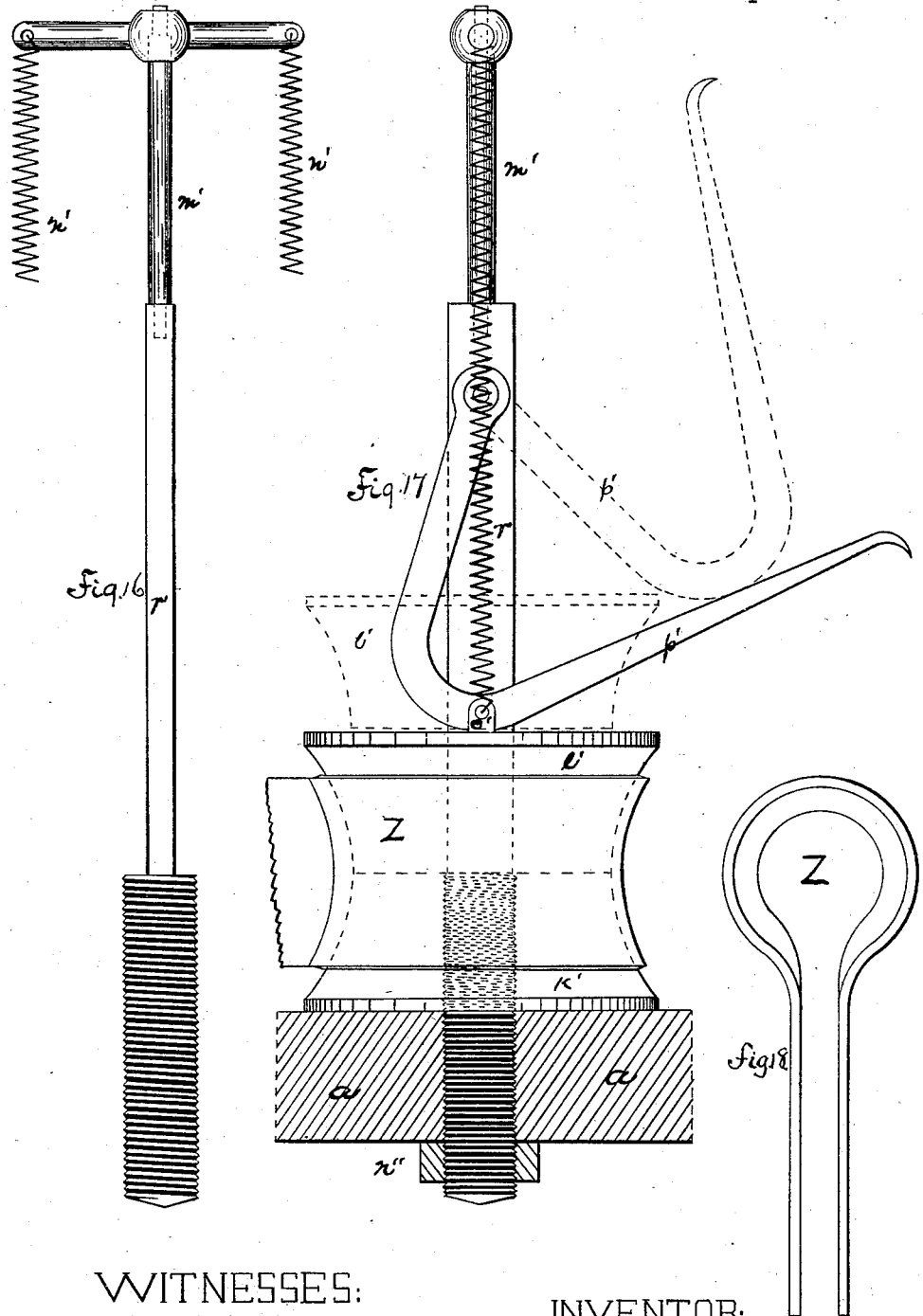
WITNESSES:
Geo. H. Marquis
H. S. Fisher
INVENTOR:
Edward Fletcher
By his atty
Herbert G. Briggs

UNITED STATES PATENT OFFICE.

EDWARD FLETCHER, OF CAPE ELIZABETH, MAINE.

MACHINE FOR MAKING STRAPS FOR TACKLE-BLOCKS.

SPECIFICATION forming part of Letters Patent No. 264,268, dated September 12, 1882.

Application filed June 3, 1881. (No model.)

*To all whom it may concern:*

Be it known that I, EDWARD FLETCHER, residing in Cape Elizabeth, in the county of Cumberland and State of Maine, have invented certain new and useful Improvements in Machines for Making Straps for Tackle-Blocks; and I do hereby declare that the following is a full, clear, and exact description of the invention, which will enable others skilled in the art to which it appertains to make and use the same.

My invention has relation to machinery for manufacturing straps for tackle-blocks and like devices.

Previous to my invention all descriptions of tackle-block straps have been hand-forged. This method has always been considered very defective and objectionable by those engaged in manufacturing tackle-blocks, for several reasons. It is extremely slow and laborious. The straps are not uniform in shape and finish when they come from the hands of the forger, and thus much labor and time are consumed in fitting the straps to the block-shells.

The purpose or object of my invention is to produce a machine which shall be simple in construction, perfectly reliable in its operations, and will obtain effects in the line of bending and shaping metallic bars for the purpose of making tackle-block straps and like devices far superior to those resulting from the method of hand-forging referred to; and to successfully accomplish this end it consists of several combinations of mechanical parts, all as will be hereinafter explicitly described, and pointed out in the claims, and fully illustrated in the annexed drawings, in which—

Figure 1 shows a top plan, partly broken out at one side, where Fig. G shows in detail the center plunger and its supplementary plunger. Fig. 2 represents a plan view of the bottom of the supporting-table, partly broken out at one side, where Fig. P shows detail of roller-guide. Fig. 3 is a side elevation. Fig. 4 designates an end view. Fig. 5 is a section of the table-top, delineating the operation of bending a block-strap, the solid lines showing mechanical parts ready to operate, dotted lines showing positions taken by the same when forming a strap. Fig 5½ shows a tackle-block and strap. Figs. 6 and 7 are details of the roller-guides and means for operating the same. Figs. 8 and 9 are respectively a top plan and sectional side view of parts to show method of connecting a pitman with a plunger-head. Figs. 10 and 10½ are details of a pitman, showing respectively top and side views. Fig. 10$^A$ is a sectional view in the plane of the line $x\,x$. Fig. 10$^B$ shows detail of wedge-key. Figs. 11 and 12 show details of a chambered head. Fig. 13 is a detail side and front of a filling-block. Figs. 14 and 15 show respectively a side and front view of a center die and attachments. Fig. 16 is a detail of the center spindle and T-piece. Fig. 17 is a detail of the operation of the center die. Fig. 18 shows an inside block-strap.

In the drawings, A represents a table of such suitable dimensions and strength that the different mechanisms embodied in my invention may be firmly attached and placed thereto. The general outline that is given to the supporting-table is fully illustrated in the several figures of the drawings, showing top and bottom plans. These also show that the supporting-table is more or less skeleton in its construction, having several branching arms or offsets. This particular form of construction is preferable simply for convenience, as it permits the greatest degree of compactness.

To facilitate description the offsets will be designated by the numerals 1 2 3 4 5 6 7 8 9. The drawings further disclose that the main body of the supporting-table is divided into two equal sections. This division is made by the open space D, inclosed within the offset 1, and a narrow slot, E, which is a continuation or prolongation of D, extending nearly to the rear of the supporting-table along its longitudinal axis. They also show that the sections of the supporting-table on each side of E are partially subdivided by the recesses J J between the offsets 6 7 8 9, and the slots $j'\,j'$, prolongations of the recesses, the relative positions of said slots $j'\,j'$ being at right angles to the slot E. The peculiar functions of the slot E and slots $j'\,j'$ will hereinafter become apparent.

$a'\,a'\,a^2\,a^3$ designate a series of journal-boxes attached to the offsets 1 2 3. These journal-boxes provide convenient bearing-surfaces for the main driving-shaft B, which runs transversely across the forward end of the supporting-table A. The ends of the driving-shaft project a short distance beyond the edges of the table on each side. On the projecting ends of the driving-shaft are placed fly-wheels $b\,b$ for equalizing the movements of the machinery. Between the fly-wheels and the outer journal-boxes, $a^2\,a^3$, bevel-gears $c\,c$ are rigidly attached to the shaft B. The driving-shaft is further provided with the belt-pulleys $d\,d$.

$e$ is a double crank for operating a pitman, centrally located on the shaft B. Surrounding the wrist of the double-crank is a journal-box, $j$, which has a cylindrical pitman-rod socket, $k$, projecting from its side at right angles.

$l$ shows a key-slot cut longitudinally in the top of the pitman-socket $k$. Diametrically opposite to the slot $l$ is a corresponding slot, $l^4$. By means of said slots $l$ and $l^4$ a key or pin can be passed entirely through the socket $k$. In the present instance the slot $l^4$ on the under side is narrower than $l$, being so constructed to best receive and securely hold a wedge-shaped key.

The letter F designates a chambered head for a die-plunger, G. The head F is located upon the top plane of the supporting-table directly over the longitudinal slot E, and when the machine is in operation the head reciprocates horizontally between the guide-cleats $t\,t$, carrying with it the die-plunger G, confined within the slot E. In order that G may be kept secure in its place in the slot E, guideways $m''\,m''$ are screwed to the under side of the table along the edges of the slot. The head F and plunger G are rigidly fastened together by any suitable means. The peculiar construction of the head F will be readily understood by reference to Figs. 11 and 12, where it is represented as having a chamber, $p$, ears $w\,w$, shoulders $x\,x$, slot $z$, recess $z^2$, and pin $f$.

My method of connecting the several parts is as follows:

H is a pitman-rod. One end of H has a cross-bar, $y$, the front face of which is rounded. The other end of the pitman-rod is pierced by a narrow wedge-shaped slot, $o$, running lengthwise of the rod. The rod is screw-threaded along part of its circumference. When the pitman is in its proper position in the machine the slotted end rests in the socket $k$, so placed that the slot $o$ shall exactly correspond with the slots $l$ and $l^4$, cut in the pitman-socket $k$. A wedge-shaped key, $v$, is then passed through the slots, and the pitman is securely held. The cross-bar $y$ having been dropped into the chamber $p$, the shoulders $x\,x$ prevent the said bar $y$ from sliding out of the chambered head whenever the same is being alternately actuated backward and forward by the pitman. The ears $w\,w$, which are simply extensions of the shoulders $x\,x$, will, in case there is a slight springing up or jumping of the pitman, assist in preventing the escape of the cross-bar $y$ from its seat by affording a longer in bearing surface for said cross-bar. Thus the connection is formed between these parts of the machine.

In order that the pitman may be lengthened or shortened as occasion may require, the socket $k$ is quite deep, and the slot $o$ is made quite long, and the longitudinal key-slots $l$ and $l^4$ are made just large enough to receive and tightly fit around the wedge-key $v$, while the slot $o$ in the pitman is cut considerably longer than the face of the key $v$; also, screw-threading is cut on that part of the periphery of the pitman which comes just outside of the socket $k$. This screw-thread is surrounded by an internally-screw-threaded stop or check nut, $q$, which is intended to fit closely and tightly against the front face of the socket $k$. To adjust the parts thus constructed the operator must first drive the wedge-key $v$ out of the slots. By the use of the hands the smooth and unthreaded end of the pitman can then be readily slipped about either into or out of the hollow socket $k$. The nut $q$ is next turned along the screw-threading and pressed hard against the socket-face when the desired point of adjustment has been reached. Then by driving the key home the pitman will be held firmly in its place.

The function of the nut $q$ is simply to aid in obtaining a more delicate adjustment than can usually be secured by sliding the pitman about by hand. The chief part of the work of adjustment is performed by the wedge-key $v$ and the wedge-slots $l$ and $l^4$ and $o$. In making this adjustment it is of course obvious that the movements of the pitman are limited by the length of the slot $o$. If there should be a very severe pulling strain or quick strong jerk on the pitman, there might be some longitudinal play of these parts; or, in other words, the pitman might be pulled out of the socket $k$ to the extent that the key $v$ could slide in the slot $o$; but practical use has demonstrated that for all the purposes of the present machine the key $v$, of a wedge shape, can be driven into its home in the slots sufficiently tight to hold the parts firmly and rigidly together and prevent them from pulling asunder. This method of adjustment is also of especial importance when it may be desirable to separate the parts, for by removing the key $v$ the pitman H can be easily taken out of the machine and another pitman of different length substituted.

In the chamber of the head F is seen a filling-block, I, composed of two parts—an enlarged top or head piece—from the bottom of which extends a long spindle provided with a perforation, $g^4$, at its lower end. The head-piece has its front face beveled, the rear face being perpendicular, so that the side faces show trapezoidal outlines. (See Fig. 13.) This filling-block is located at the rear of the chamber $p$, the perforated cylinder projecting through the slot $z$ to a filling-block rod beneath the supporting-table A. The operation of the filling-block rod will be hereinafter made plain.

It will be readily apparent that any revolution of the driving-shaft will cause the crank e to horizontally reciprocate the pitman-rod H, the latter causing the cross-bar y to reciprocate in like manner within the chamber p, and as this last-mentioned bar y reciprocates or slides it is brought successively in contact with the shoulders x x and the inclined face of the filling-block I. By this means the head F is caused to slide within the cleats t t, and the plunger G is actuated alternately backward and forward along the slot E.

My method of constructing the pitman crossbar y with a rounded face, and also of constructing the head-piece of the filling-block with an inclined front face, aids very materially in the successful working of the device. If the faces of the cross-bar y and filling-block I were perfectly flat, it might often occur that the blow of the bar against the filling-block would cause the pitman to jump up and out of the chambered head, and cause much trouble and delay in replacing the parts; but with the parts constructed and operated as set forth, when the rounded face of the cross-bar y strikes against the sloping face of the filling-block I the tendency will be to force the cross-bar into the recess under the projecting top plane of the filling-block, where it will be held down without the slightest danger of being thrown out of place.

I will now proceed to explain the other mechanical parts of my machine.

Passing to the sides of the supporting-table, $f^4 f^5 f^6 f^7 f^8 f^9$ designate an additional series of journal-boxes, set upon the offsets 4 5 6 7 8 9, projecting from the sides of the supporting-table, said journal-boxes acting as convenient bearing-surfaces for two supplementary driving-shafts, C C. The shafts C C are at right angles to the main driving-shaft and parallel with the longitudinal axis of the table. Bevel-gears g g are fixed on the forward ends of shafts C C, and said gears mesh into and engage with the bevel-gears c c on the shaft B. The sections of the shafts C C between the boxes $f^6$ and $f^7$ on one side of the table and $f^8$ and $f^9$ on the other are provided with double cranks h h. Journal-boxes i i surround the wrists of the cranks h h. m m are cylindrical socket-pieces projecting from boxes i i. Each socket-piece has two longitudinal key-slots, n n, located and made exactly like key-slots l and $l^4$.

At the rear of the supporting-table are seen the chambered plungers M M, placed upon its top surface directly over the slots $j' j'$, and confined between the guide-cleats s s s s. When in use plungers M M reciprocate horizontally across the table-top, and consequently travel in a line at right angles to the line of travel taken by the plunger G. The plungers M M are identical in general form and construction to the head F, hereinbefore described, and for sake of convenience the same detail parts will be designated by the same reference-letters. Further, the plungers M M are connected to the supplementary driving-shaft C C by pitman-rods in exactly the same manner that the pitman H joins the plunger-head F to the main driving-shaft B.

N N represent the pitman-rods, corresponding precisely in construction to the pitman H. The slotted ends of pitman-rods N N rest in the socket-pieces m m, and are securely keyed to the same. The cross-bar ends repose in the chambers of plungers M M. By means of the check-nuts u u the pitman-rods may be nicely adjusted to any desired length.

O O are filling-blocks, made and located the same as filling-blocks I. In all respects filling-blocks O O and I are identical.

In operation the bevel-gears c c, corresponding with g g, will transmit revolution to the supplementary driving-shafts, and the double cranks h h will reciprocate the pitman-rods N N, the latter in turn causing the plungers M M to reciprocate horizontally over the table-surface between the guides s s s s. The filling-blocks O O, extending through the slots $j' j'$, slide backward and forward on their rod.

When the filling-blocks I and O O are resting in the chambered head F and plungers M M the machine is said to be "in gear." When they are raised out of the chambers the machine is said to be "out of gear." Thus it is obvious that to successfully accomplish one of the objects sought by my invention it is necessary that there should be some convenient method of readily and quickly throwing the mechanical parts in and out of gear—i. e., to raise and lower the filling-blocks. To achieve this result I have devised a combination of rods, springs, and treadles, which are located beneath the supporting-table. In the exemplification of the invention, Fig. 4 shows the treadle arrangement connected with and regulating the movements of the filling-blocks O O.

$r'$ designates a frame-work of rod-iron or other suitable material, fastened to the bottom of the supporting-table, and provided with perforations at the points $s' s'$. Extending through these perforations are the treadle-rods $t' t'$, the lower ends of the same being fastened to the treadle-bar S. The tops of treadle-rods $t' t'$ have perforated enlargements or heads $v' v'$. Passing between and through these heads, and through the perforations $g^4 g^4$ in the ends of the filling-block spindles, is a "filling-block rod," $w'$, so called because the filling-blocks travel back and forth upon it. That part of each treadle-rod included between the heads $v' v'$ and the frame $r'$ is surrounded with a coil spiral spring, $w' w'$. The peripheries of the treadle-rods are screw-threaded at about the points where they pass through the perforations $s' s'$. $x' x'$ are check-nuts fitting the screw-threads. The treadle-bar S is pivoted at some convenient point near the forward end of the machine.

As the treadle device governing the operations of the filling-block I is constructed practically the same as that already set forth, specific description of its parts will be omitted; but for convenience hereinafter like parts will be designated by the same letters of reference raised to the second power—to wit, $r'' s'' t''$, &c.

The position of the treadle mechanism and filling-blocks O O, when the filling-blocks O O are disengaged, is correctly shown by dotted outlining in Fig. 4. The solid outlining represents the filling-blocks engaged. When the machine is quiescent the filling-blocks are normally disengaged or out of gear. The operation of raising and lowering the filling-blocks is perfectly easy and simple. Pressure being exerted upon the foot-plate, the treadle-rod S and connected filling-block rod $u'$ will be carried downward, and consequently the filling-blocks will be depressed into the chambers in the plungers M M, and those parts of the machine will be in gear. The moment that the pressure is taken off the treadle foot-plate the spiral springs $w'$ $w'$, which have been compressed between the heads $v'$ $v'$ and the frame $r'$, will elongate and raise the filling-blocks, and the parts will be out of gear. The filling-block I is raised and lowered by precisely the same operations as are the filling-blocks O O. By the use of a wrench on the check-nuts $x'$ $x'$, fitting the screw-thread, the distance of rise and fall of the filling-blocks can be regulated at pleasure.

P P are what I term "roller-guides." They are attached to blocks which fit into slots $b'$ $b'$, cut through the supporting-table near the rear, said slots $b'$ $b'$ being located close beside and parallel to the longitudinal slot E. On the under side of the table are seen guide-cleats $a''$ $a''$, which hold the blocks in place.

For a more specific description of the roller-guides reference is here made to detail Figs. 6 and 7, in which $c'$ represents the block fitting into a slideway, $c^2$, running longitudinally along the top plane of a sliding piece, $c^4$. $d'$ denotes a sleeve free to revolve upon a standard rising perpendicularly from the block $c'$. The standard projects below the block $c'$ down through a narrow longitudinal slot, $h'$, cut entirely through the sliding piece $c^4$ nearly its whole length, and the end of the standard extending beyond said sliding piece $c^4$ is provided with a tightening-nut, $i'$. $e'$ represents a flange, upon which sleeve $d'$ rests. A circular washer, $g'$, is placed above $d'$.

The bar of metal to be bent into a tackle-block strap, before being subjected to the operations of the plungers, is placed flatwise against these rollers, one edge resting on the flange $e'$, the other against the washer $g'$. Figs. 6 and 7 show a bar so placed. The rollers can be accommodated to different widths of bars by unscrewing the nuts $e''$ and removing the sleeves $d'$ $d'$ and replacing them by others of different lengths.

When the machine is in operation the roller-guides play an important part. They are so constructed as to be capable of two movements—first, in a direction at right angles to the longitudinal axis of the machine; second, in a line parallel to said axis. The first motion is brought about by adjustment as special occasions arise. The second motion is constant, and acts in connection with the treadle mechanism governing the operations of the plunger G. In the first instance, when the roller-guides P P are once set in relation to their distances from the line of travel of the "center die," to be hereinafter described, they remain stationary. As it is part of my mechanical scheme to actuate the said center die along the slot E, lying between the roller-guide, it will often occur, when the diameter of the die is changed, that it will be necessary to adjust the roller-guides so that they can be brought close to or removed to a considerable distance from the slot E. To accomplish this the operator first loosens the tightening-nut $i'$. He can then at will slide the standard in the slot $h'$ and the block $c'$, and consequently the roller-guide P, along the slideway $c^2$ until the desired point of adjustment is reached. Then by setting up the tightening-nut the roller-guide will be held stationary until it is found desirable to again change its position. A series of practical experiments has demonstrated that the best results can be accomplished by giving the said roller-guides a limited reciprocating motion parallel to the slot E. This can be best illustrated by direct reference to Figs. 6 and 7 of the details. These will show two small rods, $o^2$ $o^2$, fastened to the forward edge of the sliding piece $c^4$. $m^2$ is also a rod attached to some convenient point on the under side of the supporting-table. The three rods $o^2$, $o^2$, and $m^2$ converge nearly to a point, and are united by a knuckle-joint, $k^2$. Leading from the knuckle-joint $k^2$ to and attached to the treadle-rod $S''$ is a treadle-connecting rod, $l^2$. The design of the rods $o^2$, $o^2$, and $m^2$, knuckle-joint $k^2$, and treadle-connecting rod $l^2$ is to furnish a sure and convenient method of actuating the roller-guide P backward and forward in the slot $b'$ a short distance in a line parallel to the slot E, but directly opposite to the line of travel of the plunger contained within said slot. To accomplish this result I operate as follows: As before described, the rod $m^2$ has one end made fast and secure to the bottom of the supporting-table; also the sliding piece $c^4$, connected to the other end of $m^2$ by means of the rods $o^2$ $o^2$ and knuckle-joint $k^2$, is free and at liberty to slide within the limits of the opening $b'$. Now, if pressure is applied to the treadle-rod $S''$, the treadle-connecting rod $l^2$ will exert a downward pull on the knuckle-joint $k^2$, and the tendency will be to move the sliding piece $c^4$, with its firmly-attached roller-guide P, along the opening $b'$ in the direction of the fixed end of $m^2$ and cause the parts to assume the position indicated by the dotted outlining in Fig. 6. As the connecting-rod $l^2$ is fastened to the treadle-rod $S''$, regulating the plunger G, it is readily obvious that, although plunger G and roller-guides P P may travel in parallel paths, still their directions of motion will be opposite—that is to say, when the plunger G begins to move toward the front of the machine the sliding pieces $c^4$ $c^4$, with their roller-guides P P, will advance toward the rear end of the supporting-table. When the treadle-bar S'' is relieved of all pressure it will be drawn upward, as before indicated, and the treadle-connecting rod $l^2$ will exert an upward thrust on the knuckle-joint $k^2$, which will cause the sliding piece $c^4$ to move backward in the opening $b'$ and assume the position shown in solid outlining, Fig. 6.

The letter L denotes what I call a "center die," or an "inside former," so called because in the manufacture of tackle-block straps, thimbles, or similar articles which are usually bent, wholly or in part, into rings, with a hollow or groove round their circumferences, its peculiar function is to give shape and form to the inside of said grooved circumferences. Die L rests upon a block, $a$, which travels within the longitudinal slot E, directly in advance of the plunger G. As this center die is one of the chief elements of my invention, great care has been used to illustrate in the drawings the minutest details of its construction. My so-called "center die" is composed of the following enumerated parts: A stout standard or center spindle is designated by $r$. The lower end of this spindle is a screw-threaded cylinder. The upper end is flattened. The lower end is screwed into the block $a$.

$n''$ is a tightening or check nut screwed to the end of spindle $r$, which projects beneath the block, to keep the spindle from turning.

Resting upon the block $a$, and surrounding the spindle, is a circular disk made up of the two disks $k'$ and $l'$. The upper rim of $k'$ is cavetto-molded, and the same formation is given to the lower rim of $l'$, so that when the disks are united by placing one exactly above the other a consolidated disk is produced having its whole periphery concavely grooved. $k'$ is permanently screwed to the spindle. $l'$ is slotted, so that it can be easily moved up and down the flattened part of the spindle.

Fitting into a rest in the top end of the spindle $r$ is a T-shaped piece, $m'$. Spiral lifting-springs $n'$ $n'$ extend from the ends of the T cross-beam to lugs $o'$ $o'$, located on the top of disk $l'$.

$p'$ is a bent depressing-rod, conveniently pivoted to the spindle at the point $p^3$. The curved part of $p'$ rests on $l'$.

Of course if a band of heated metal is first bent around a solid grooved circular disk, and then pressed into the concavity or groove, it will be impossible to remove it in a perfect condition. With my center die, however, constructed as above set forth, I am enabled to bend and shape a block-strap or thimble-eye concavely grooved on its circumference and correspondingly convexly raised on its inside—like Z, Fig. 18, for example—around a grooved disk and easily remove it from the disk without experiencing the least difficulty or injuring the strap in the slightest degree. This I accomplish as follows: After the blows of the plungers have given the proper shape to the metallic bar the depressing-rod $p'$ is raised, as indicated by the dotted lines, when the natural contraction of the springs $n'$ $n'$ lifts the top disk, $l'$, away from $k'$ and slides it up the flattened spindle $r$. The strap can then be easily removed by slipping it off of spindle $r$. Depressing-rod $p'$ being pressed downward, the disk $l'$ is returned to its original position, recumbent upon $k'$.

Screwed into the under side of the block $a$ is a standard, $q'$, with its lower end bifurcated.

R is a bent arm pivoted between the forks of $q'$. In general terms, the arm R is bent into a shape somewhat approaching a reverse curve. Attached to a lug at the lower end of arm R is a locking-rod, $h''$. From arm R this locking-rod extends to a slotted bar, $k''$, suspended from the bottom surface of the supporting-table. Near the point where the rod $h''$ passes through bar $k''$ it is provided with an angle. $l''$ is a spiral spring, also connected with a lug, $m^4$, at the foot of arm R, and extending from said lug $m^4$ to any convenient point beneath the table. The particular design of arm R and attendant mechanism is to firmly set and hold a bar of iron against the periphery of the center die. Thus when a heated bar of metal is first inserted into the machine its central part is placed directly athwart the path of the center die, and, as before indicated, the bar is laid flatwise against the roller-guides P P. At this time the center die and roller-guides are so nearly in a straight line that the bar is tangent to the rollers toward the forward end of the table and tangent to the center die toward the rear of the table. If the center die should now be struck and forced toward the rear of the slot E by the plunger G, the bar would obviously be bent and doubled up. Experience has demonstrated that although the bars would bend and double up, yet there would be more or less longitudinal movement of the iron bars at the starting-point. This trouble arose from the fact that unless extraordinary care and attention were exercised in heating the metal bars the most-heated points would not be exactly centrally located. Such being the case, when the die began to bear against the bar the most-heated points would bend first and the bar would work to one side or the other, bringing said heated point directly in front of the center die, and as a result the two branches of the U-shaped piece would be of unequal lengths. To overcome this difficulty, just as the plunger is ready to strike the center die a blow the locking-rod $h''$ is disengaged by lifting the angle so that it will slide through the slotted end of bar $k''$. The natural contraction of the spiral spring $l''$ will swing the arm R on its pivot $g^3$ and throw the upper end against the heated part of the bar with a sharp smart blow. The end of arm R is bifurcated, the bifurcations being beveled quite to an edge, which gives the bar R a good gripping-power, which is sufficient to slightly bend the iron and set it so that there shall be no danger of its moving endwise. The force of the blow given by the arm can be regulated by the strain given to the spring. After the center die has been struck by the plunger G the arm R travels for a few inches, gripping the iron bar until it comes in contact with the angular staple W, which underruns the arm and trips up its lower end. This act draws the bifurcated head of arm R away from the gripped bar and depresses it into the slot E. It also draws the locking-bar longitudinally through bar $k''$ until the angle is reached, when it drops down and arm R is locked.

Having thus described the construction, general arrangement, and combination of the several parts of my newly-organized block-strap machine, I will now proceed to set forth its mode of operation.

Perhaps the clearest understanding of the uses to which I intend to put my block-strap machine can be obtained by giving a correct history of the different operations involved in making a block-strap like Z in Fig. 18. This operation is illustrated by Fig. 5. Suitable dies or formers, V V, are fastened to the pins $f$, Fig. 1, and another die, V', is placed at the rear of the table, directly in line of F, said die V' being held in its place by the set-screws $b^4$. A top rib or supplementary die-plunger, $b^2$, is conveniently bolted to the top of plunger G, the end of rib $b^2$ being convex, so as to exactly fit the concave groove of the center-die disk. A centrally-heated bar of iron of any convenient length is then slipped flatwise against the center-die disk and tangent to rollers P P. The locking-bar is then lifted up, the contraction of the spring throwing the bifurcated end of arm R against the bar and setting the same. Pressure is then exerted upon the foot-plate of treadle S", which puts the head F into gear. Immediately the plunger G begins to travel along the longitudinal slot E, as before described, the roller-guides advance a short distance, catch the bar, and press hard against it. The supplementary plunger $b^2$ strikes the center die and carries it along toward the rear of the machine, and the arm R is pushed out of the way, as before indicated. As the plunger G, with its supplementary plunger $b^2$, advances, the bar of iron is bent and slides endwise by the rollers P P. When the center die reaches the die V' the iron bar is U-shaped. One or more blows of the reciprocating plunger against the center die will form the end. Then by pressing down upon the foot-plate of treadle S" the heads M M will be put in gear, and the dies V V will complete the operation of forming the thimble-eye and flatten the branches of the strap against the supplementary plunger $b^2$. By relieving the treadle-bars of all pressure the filling-blocks will be raised and the several pitman-rods will continue to reciprocate under the filling-block heads, and the plungers will remain stationary until the parts are again thrown into gear. The center die is then divided and the strap removed.

In practice the above operations are consummated in a very limited space of time, and a large number of block-straps or other like articles can be manufactured in the course of a few hours.

The advantages of my invention are the great speed with which block-straps and like devices can be manufactured and the uniformity of finish given to each block-strap or like device.

It is evident that many changes and modifications in detail of construction, and also in the relative arrangement of the several parts of the machine, may be resorted to without departing from the spirit and intention of my invention. Especially is this the case in reference to the method of driving the plungers, steam-pistons and hydraulic apparatus being equally applicable under certain circumstances.

Having fully described my invention, what I claim as new, and desire to secure by Letters Patent, is—

1. In a machine substantially as described, in combination with the double-cranked main driving-shaft B, the journal-box $j$, which surrounds the double crank $e$, a side-projecting pitman-socket, $k$, longitudinally slotted at $l$ and $l^4$, a pitman-rod, H, with wedge-key slot $o$, constructed and arranged to correspond with said slots $l$ and $l^4$, and a wedge-key, $v$, substantially as and for the purposes herein set forth.

2. The combination of the filling-block I with the filling-block rod $u''$, treadle-rods $t'' t''$, treadle-bar S", spiral springs $w'' w''$, check-nuts $x'' x''$, and frame-work $r''$, substantially as and for the purposes herein specified.

3. In a machine substantially as set forth, the combination of a double-cranked main driving-shaft, B, a pitman-rod, H, adjustably connected, as herein set forth, a round-faced cross-bar, $y$, attached to the free end of the rod H, a chambered head, F, said chambered head having, as shown, a recess, $z^2$, a spindle-slot, $z$, a shaft, $f$, a chamber, $p$, in which said cross-bar $y$ reciprocates, shoulders $x\ x$, and extension in bearing ears $w\ w$, and a filling-block, I, constructed, as described, with a sloping face to receive the blows of the round-faced cross-bar $y$, the whole arranged and constructed to operate together, substantially as specified, for the purpose of reciprocally actuating the die-plunger G and its supplementary plunger $b^2$ along the longitudinal slot E, all substantially as described.

4. The combination of the plunger G, center die, L, roller-guides P P, and mechanisms for actuating the same in a line parallel to the axis of the supporting-table, and formers V V' for the purpose of producing a U-shaped piece, having its segmental part concave on its outside and convex on its inside, substantially as set forth.

5. The combination of the filling-blocks O O with the frame having slots $j'$ $j'$, rod $u'$, treadle-rods $t'$ $t'$, treadle-bar S, spiral springs $w'$ $w'$, check-nuts $x'$ $x'$, and frame-work $r'$, substantially as and for the purposes herein specified.

6. In combination, the sectional center die, L, the roller-guides P P, the plunger G, having chambered head F, and a top rib or supplemental plunger against which the branches of the blank are bent, said plunger being adapted to drive the center die, the fixed die V', the side dies, V V, and the chambered plunger-heads M M, substantially as described.

7. In a machine substantially as described, the combination of the roller-guides P P, consisting of the following elements, viz., a perpendicular standard attached to the sliding block $c'$ in the manner specified, a sleeve, $d'$, a projecting base-flange, $e'$, a washer, $g'$, and nuts $e''$ and $i'$, with the sliding base-block $c'$ and the sliding piece $c^4$, provided, as herein described, with the longitudinal slots $c^2$ and $h'$, said parts being constructed and arranged substantially in the manner and for the purpose specified.

8. The combination of the roller-guides P P, the sliding blocks $c^4$ $c^4$, knuckle-joints $k^2$ $k^2$, rods $m^2$ $m^2$, treadle-connecting rods $l^2$ $l^2$, rods $o^2$ $o^2$, and treadle-rod S'', substantially as and for the purposes herein set out.

9. The combination of mechanical parts herein set forth, consisting of a center spindle, $r$, set in a sliding block, $a'$, two cavetto-molded disks, one, $k'$, fixed upon said center spindle, $r$, the other, $l'$, slotted and capable of being lifted and depressed, T-piece $m'$, spiral lifting-springs $n'$ $n'$, lugs $o'$ $o'$, and bent depressing-bar $p'$, the whole to co-operate and act as and for the uses specified.

10. The combination of the center die, L, sliding block $a'$, bifurcated standard $g'$, bent bifurcated arm R, and the angular staple W, which acts on the arm R to disengage it, substantially as specified.

11. The combination, substantially as described, of the bent bifurcated arm R with the locking-rod $h''$, hanging slotted bar $k''$, and spiral spring $l''$, substantially as and for the purposes specified.

12. In a machine substantially as described, the combination of the roller-guides P P, the mechanism for operating the same, substantially as set forth, and the center die, L, substantially as and for the purposes herein explained.

13. In a machine substantially as described, the combination, with the center die, L, of the gripping-arm R and mechanism for operating the same, substantially as and for the purposes set forth.

14. In a machine for forming pulley-block straps, the combination of the bed-plate A, crank-shafts B and C C, gears $cc$ and $gg$, plunger G, block $a'$, die L, roller-guides P P, formers V V', cranks $e$ and $h$ $h$, and pitmen H and N N, and operating connections, substantially as described.

15. The combination, substantially as set forth, of the fixed die V' and the sliding side dies, V V, with the plunger G, having a top rib or supplemental plunger, $b^2$, and the center die, the said plunger G and the said center die being independent of each other, whereby the said plunger is adapted to act upon the center die proper by contact only, substantially as described.

16. The sectional center die having its upper section movable upon a vertical spindle which carries it, in combination with a sliding block upon which the base-section is mounted, a cam-depressing lever pivoted to said spindle, fixed and sliding dies, and a plunger arranged to operate in conjunction with the center die in the manner set forth.

17. The center die, L, composed of the following elements, to wit: a vertical spindle having at its base a fixed cavetto molded section, and provided with a top movable cavetto-molded section, in combination with means for depressing and locking said movable section and for automatically elevating the same, the sliding block $a$, and the plunger G; the said sliding block and the said plunger being adapted to slide in the same guideway independently of each other, substantially as described.

In testimony that I claim the foregoing as my own I have affixed my signature in the presence of two witnesses.

EDWARD FLETCHER.

Witnesses:
HERBERT G. BRIGGS,
ELEAZER A. CROWELL.